United States Patent
Liu et al.

(10) Patent No.: US 12,281,947 B2
(45) Date of Patent: Apr. 22, 2025

(54) MULTIPOINT SERIES SENSOR IN ELECTRIC HEATING ELEMENTS

(71) Applicant: WATLOW ELECTRIC MANUFACTURING COMPANY, St. Louis, MO (US)

(72) Inventors: Xin Liu, St. Louis, MO (US); Eric Ludwig, St. Louis, MO (US)

(73) Assignee: Watlow Electric Manufacturing Company, St. Louis, MO (US)

(*) Notice: Subject to any disclaimer, the term of this patent is extended or adjusted under 35 U.S.C. 154(b) by 191 days.

(21) Appl. No.: 17/443,609

(22) Filed: Jul. 27, 2021

(65) Prior Publication Data

US 2022/0026285 A1  Jan. 27, 2022

Related U.S. Application Data

(60) Provisional application No. 63/056,850, filed on Jul. 27, 2020.

(51) Int. Cl.
  *G01K 7/16* (2006.01)
  *G01K 7/02* (2021.01)
  *G01K 15/00* (2006.01)

(52) U.S. Cl.
  CPC ............. *G01K 7/16* (2013.01); *G01K 15/007* (2013.01); *G01K 7/02* (2013.01)

(58) Field of Classification Search
  CPC ........... G01K 7/16; G01K 15/007; G01K 7/02

USPC ......................................................... 374/185
See application file for complete search history.

(56) References Cited

U.S. PATENT DOCUMENTS

| | | | |
|---|---|---|---|
| 2016/0353521 A1* | 12/2016 | Reynolds | H05B 1/0261 |
| 2019/0170400 A1 | 6/2019 | Everly et al. | |
| 2020/0236739 A1* | 7/2020 | Ohse | H05B 1/0297 |

FOREIGN PATENT DOCUMENTS

| | | | |
|---|---|---|---|
| JP | S5682422 A | * | 7/1981 |
| JP | S56082422 A | | 7/1981 |

OTHER PUBLICATIONS

International Search Report for corresponding International Application No. PCT/US2021/070975, mailed Nov. 17, 2021, 10 pages.

* cited by examiner

*Primary Examiner* — Natalie Huls
*Assistant Examiner* — Michael J Singletary
(74) *Attorney, Agent, or Firm* — Burris Law, PLLC (57) ABSTRACT

A temperature sensing system includes a plurality of resistive segments connected in electrical series. Each resistive segment defines a material different from a material of an adjacent resistive segment, and the plurality of resistive segments are joined at sensing junctions to define a plurality of sensing junctions along a length of the resistive segments. A temperature deviation is calculated from the plurality of sensing junctions based on electric potential at each of the sensing junctions.

22 Claims, 6 Drawing Sheets

MULTIPOINT SERIES SENSOR IN ELECTRIC HEATING ELEMENTS

CROSS-REFERENCE TO RELATED APPLICATION

This application claims priority to and the benefit of U.S. Provisional Application No. 63/056,850, filed on Jul. 27, 2020. The disclosure of the above application is incorporated herein by reference.

FIELD

The present disclosure relates to a temperature sensing system for a heater system.

BACKGROUND

The statements in this section merely provide background information related to the present disclosure and may not constitute prior art.

A heating system, such as a fluid heating system, generally includes a heater that is operable to heat an object (e.g., wafer, liquid, gas, etc.) and a control system for controlling the heater. A temperature sensor is commonly used to measure temperature over-runs throughout the fluid of the heating system, which is typically at the end portions of heaters within fluid heating systems. For example, a fluid heating system, such as a heat exchanger, typically includes discrete thermocouples for measuring fluid temperature at the locations of the thermocouples. However, if a high temperature condition or a temperature over-run occurs at a location away from the thermocouples, this condition is difficult to detect.

These challenges associated with detecting high temperature conditions, or temperature over-runs, away from discrete temperature sensors are addressed by the present disclosure.

SUMMARY

This section provides a general summary of the disclosure and is not a comprehensive disclosure of its full scope or all of its features.

In one form, the present disclosure is directed toward a temperature sensing system that includes a plurality of resistive segments connected in electrical series. Each resistive segment defines a material different from a material of an adjacent resistive segment, and the plurality of resistive segments are joined at sensing junctions to define a plurality of sensing junctions along a length of the resistive segments. A temperature deviation is determined from the plurality of sensing junctions based on electric potential at each of the sensing junctions.

In one form, the plurality of resistive segments are arranged in parallel legs having a u-shaped end portion between the parallel legs, where one parallel leg consists of a single material.

In another form, each of the resistive segments defines a length, and a length of each resistive segment is the same.

In yet one form, each of the resistive segments defines a length, and a length of at least one resistive segment is different from a length of another resistive segment.

In one form, a plurality of heating devices includes the temperature sensing system.

In another form, the plurality of resistive segments of the temperature sensing system are embedded in or disposed on an outer surface of each of the plurality of heating devices.

In yet another form, the plurality of resistive segments of the temperature sensing system are embedded in or disposed on an outer surface of at least one of the plurality of heating devices.

In one form, at least one heating device includes a number of resistive heating wires defining a number of heating zones.

In another form, the number of sensing junctions is equal to the number of the heating zones.

In yet another form, at least one heating device includes a single resistive heating wire defining one heating zone.

In another form, a heat exchanger includes the plurality of heating devices.

In one form, the present disclosure is directed toward a temperature sensing system that includes a multipoint series sensor having two parallel legs connected via a u-shaped end portion. One of the two parallel legs includes a plurality of resistive segments connected in electrical series, where each resistive segment defines a material different from a material of an adjacent resistive segment, and the plurality of resistive segments are joined at sensing junctions to define a plurality of sensing junctions along a length of the resistive segments. A temperature deviation is determined based on electric potential at each of the sensing junctions.

In another form, the temperature sensing system further includes a controller that is electrically coupled to the multipoint series sensor and configured to measure an output voltage of the multipoint series sensor and to determine occurrence of the temperature deviation based on the output voltage.

In yet another form, the other one of the two parallel legs is defined by a single material.

In one form, each of the resistive segments defines a length, and the length of each resistive segment is the same.

In another form, each of the resistive segments defines a length, and a length of at least one resistive segment is different from a length of another resistive segment.

In yet another form, a plurality of heating devices includes the temperature sensing system.

In one form, the plurality of resistive segments of the temperature sensing system are embedded in or disposed on an outer surface of at least one of the plurality of heating devices.

In another form, at least one heating device comprises a number of heating zones.

In another form, the number of sensing junctions is equal to the number of the heating zones.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
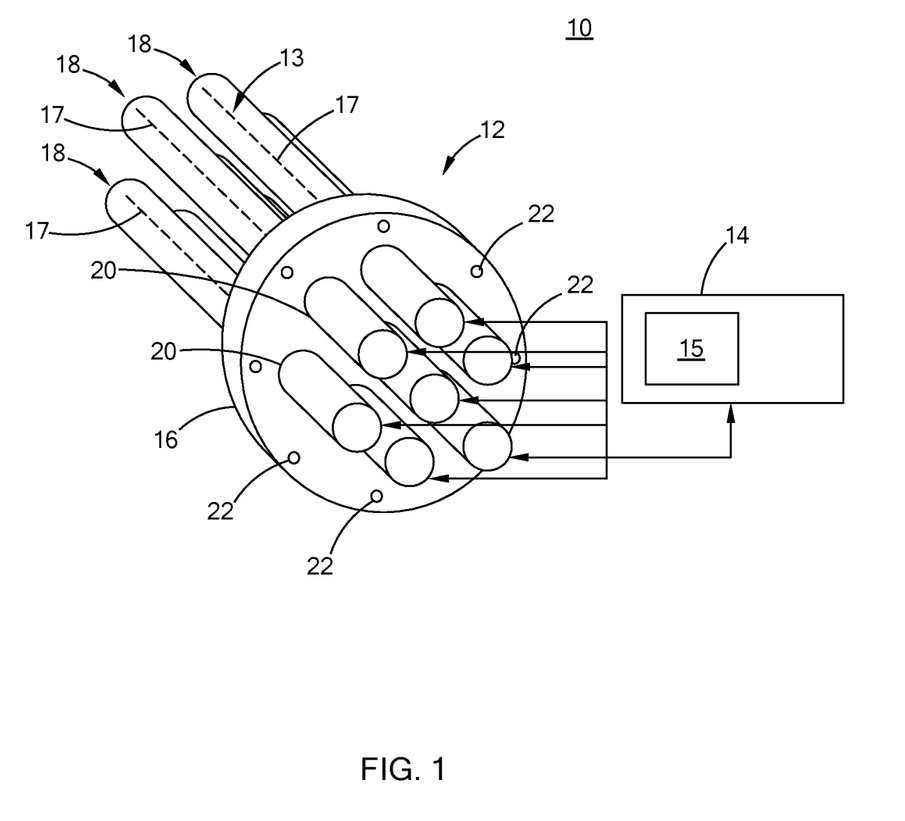
FIG. 1 is a perspective view of a heater system including a heater bundle and incorporating a temperature sensing system constructed in accordance with the teachings of the present disclosure.

Referring to FIG. 1, a heater system 10 constructed in accordance with the teachings of the present disclosure includes a heater bundle 12, a temperature sensing system 13 embedded in or disposed on the heater bundle 12 for measuring temperatures of the heater bundle 12, and a power supply device 14 electrically connected to the heater bundle 12. The power supply device 14 includes a controller 15 for controlling power supply to the heater bundle 12. A "heater bundle", as used in the present disclosure, refers to a heater apparatus including two or more physically distinct heating devices 18 that can be independently controlled. Therefore, when one of the heating devices 18 in the heater bundle 12 fails or degrades, the remaining heating devices 18 in the heater bundle 12 can continue to operate.

In one form, the heater bundle 12 includes a mounting flange 16 and a plurality of heating devices 18 secured to the mounting flange 16. The mounting flange 16 includes a plurality of apertures 20 through which the heating devices 18 extend. Although the heating device 18 are arranged to be parallel in this form, it should be understood that alternate positions/arrangements of the heating devices 18 are within the scope of the present disclosure.

As further shown, the mounting flange 16 includes a plurality of mounting holes 22. By using screws or bolts (not shown) through the mounting holes 22, the mounting flange 16 may be assembled to a wall of a vessel or a pipe (not shown) that carries a fluid to be heated. At least a portion of the heating devices 18 are immersed in the fluid inside the vessel or pipe to heat the fluid in this form of the present disclosure.

The temperature sensing system 13 includes a plurality of multipoint series sensors 17 (shown in dashed lines in FIG. 1) embedded in or disposed on the plurality of heating devices 18 for measuring a temperature of each of the heating devices 18 and for detecting an occurrence of a thermal runaway of the heating devices 18.

Figure 2:
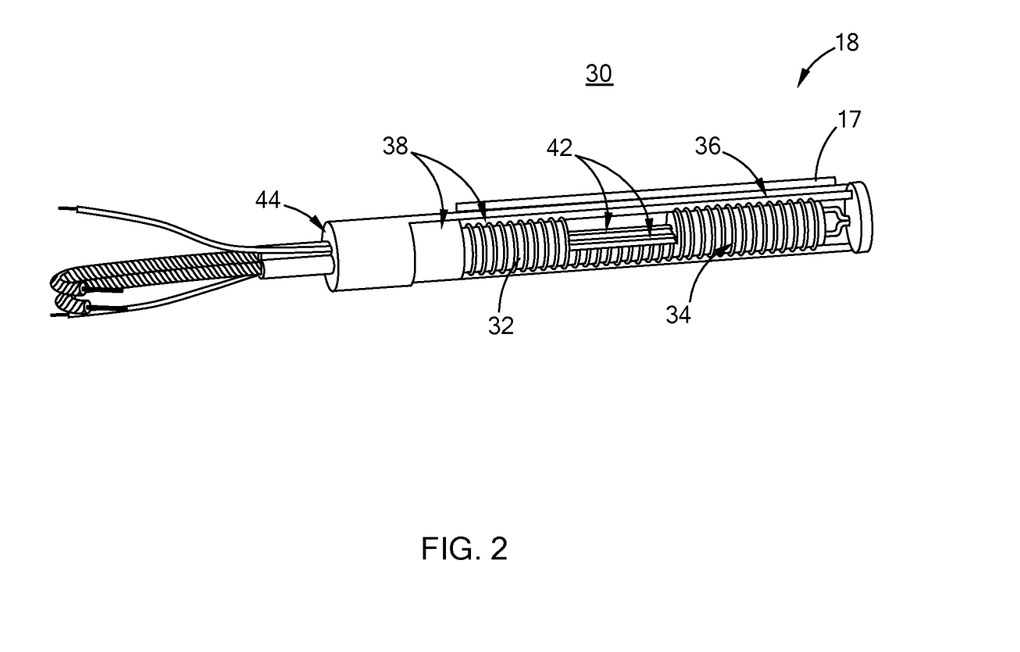
FIG. 2 is a perspective view of a heating device of the heater system of FIG. 1 according to the teachings of the present disclosure.

Referring to FIG. 2, each of the heating devices 18 according to one form may be in the form of a cartridge heater 30. The cartridge heater 30 is a tube-shaped heater that generally includes a core body 32, one or more resistive heating wires 34 wrapped around the core body 32, a metal sheath 36 enclosing the core body 32 and the resistive heating wire(s) 34 therein, and an insulating material 38 filling in the space in the metal sheath 36 to electrically insulate the resistive heating wire(s) 34 from the metal sheath 36 and to thermally conduct the heat from the resistive heating wire 34 to the metal sheath 36. The core body 32 may be made of ceramic. The insulation material 38 may be compacted Magnesium Oxide (MgO). A plurality of power conductors 42 extend through the core body 32 along a longitudinal direction and are electrically connected to the resistive heating wires 34. The power conductors 42 also extend through an end piece 44 that seals the outer sheath 36. The power conductors 42 are connected to the external power supply device 14 (shown in FIG. 1) to supply power from the external power supply device 14 to the resistive heating wire(s) 34. While FIG. 2 shows only two power conductors 42 extending through the end piece 44, more than two power conductors 42 can extend through the end piece 44. For example, when more than one resistive heating wires 34 are disposed in the heating device 18 to define a plurality of heating zones, more than two power conductors 42 may extend through the end piece 44 to supply power to more than one resistive heating wires 34. The power conductors 42 may be in the form of conductive pins. In one form, the multipoint series sensors 17 may be embedded in or disposed on an outer surface of the cartridge heater 30. It should be understood that the form illustrated herein is merely exemplary and should not be construed as limiting the scope of the present disclosure.

Figure 3A:
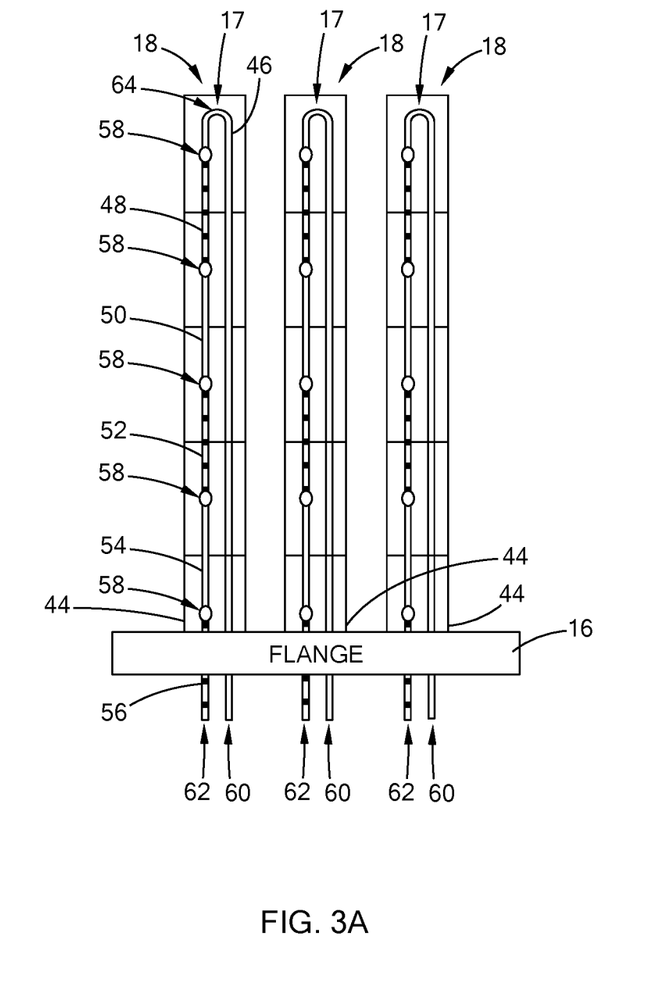
FIG. 3A is a schematic side view of the heater bundle of FIG. 1, showing a plurality of multipoint series sensors on the heating devices, according to the teachings of the present disclosure.

Referring to FIG. 3A, a multipoint series sensor 17 may be embedded in or disposed on an outer surface of each of the heating devices 18 of the heater bundle 12 for measuring a temperature of each of the heating devices 18. The multipoint series sensor 17 includes a plurality of resistive segments 46, 48, 50, 52, 54, and 56 connected in electrical series to form a plurality of sensing junctions 58 therebetween. The plurality of segments 46, 48, 50, 52, 54, and 56 are connected and arranged such that the multipoint series sensor 17 has a tong-like configuration and defines a first leg 60, a second leg 62, and a u-shaped end portion 64 connecting the first leg 60 to the second leg 62. The free ends of the first leg 60 and the second leg 62 extend through the end piece 44 of the heating device 18 connected to the flange 16.

In the illustrative example of FIG. 3A, six (6) resistive segments are used to form five (5) sensing junctions 58. Each of the resistive segments 46, 48, 50, 52, 54, and 56 define a material different from a material of an adjacent resistive segment and one leg (e.g., the first leg 60) is made of a single material. In one form, the segments 46, 50, and 54 are made of a first conductive material (shown in solid lines for illustration purposes), and the segments 48, 52, and 56 are made of a second conductive material (shown in dotted lines for illustration purposes).

Figure 3B:
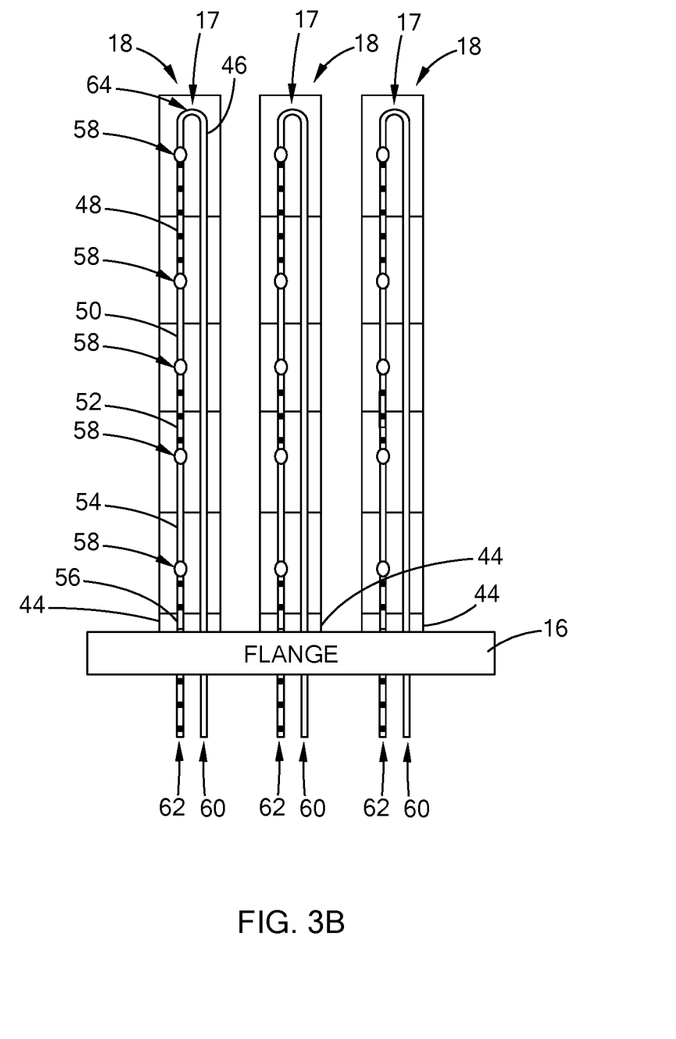
FIG. 3B is a schematic side view of a heater bundle having a plurality of multipoint series sensors on the heating devices in another form in which a length of at least one resistive segment is different from a length of another resistive segment, according to the teachings of the present disclosure.

In one form, the plurality of resistive segments are arranged in parallel legs (e.g. the first leg 60 and the second leg 62) having the u-shaped end portion 64 between the parallel legs, where one parallel leg (e.g. the first leg 60) is made of a single material. The resistive segment 46 defines the first leg 60 and the u-shape end portion 64. The resistive segments 48, 50, 52, 54 and 56 are connected to jointly define the second leg 62. Each of the resistive segments 48, 50, 52, 54, and 56 have a length. In one form, as shown in FIG. 3A, the length of each resistive segment 48, 50, 52, 54, and 56 is the same or equal to a length of another resistive segment 48, 50, 52, 54, and 56. Alternatively, referring to FIG. 3B, the length of at least one resistive segment 48, 50, 52, 54, and 56 is different from a length of another resistive segment 48, 50, 52, 54, and 56. For example, the resistive segment 48 has a length different from the resistive segments 50 and 52, as shown in FIG. 3B. In yet another example, the length of the resistive segment 56 may be different from that of resistive segments 48, 50, 52, and 54.

While five (5) sensing junctions are shown, it is understood that fewer or more sensing junctions 58 may be formed along the length of the heating device 18 depending on the structure of the heating device 18. For example, when the heating device 18 includes a number of resistive heating wires 34 defining a number of heating zones, the number of the sensing junctions 58 may be equal to the number of the heating zones to detect the temperatures of each heating zone. On the other hand, when the heating device 18 includes only one resistive heating wire defining only one heating zone, the multipoint series sensor 17 having a plurality of sensing junctions 58 is beneficial in detecting a temperature of the heating device 18 along the length of the heating device 18.

One of the first and second conductive materials may be a nickel-aluminum alloy, such as the ALUMEL® brand, and the other one of the first and second conductive materials may be a nickel-chromium alloy, such as the CHROMEL® brand, to form a plurality of K-type thermocouples with a plurality of thermocouple junctions at junctions of the nickel-chromium alloy/nickel-aluminum alloy wires. It should be understood that any combination of wire materials and thus any types of thermocouples may be used without departing from the scope of the present disclosure. Further, in yet other forms, more than two wire materials as described herein may be employed.

Figure 4:
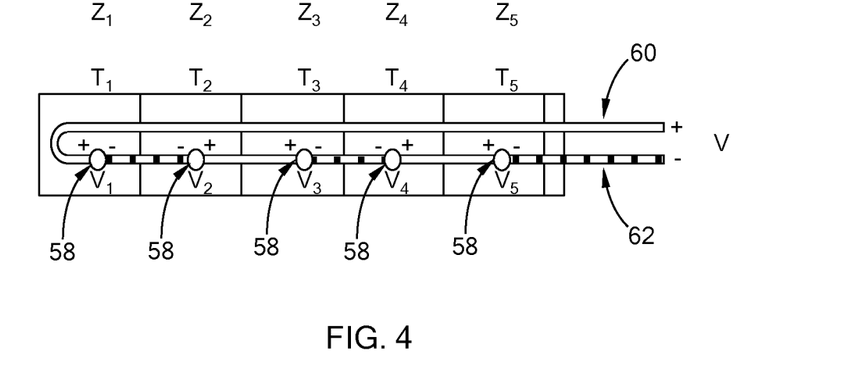
FIG. 4 is a schematic electric diagram of a multipoint series sensor of a temperature sensing system, where the heating device has a uniform temperature along the length of the heating device, according to the teachings of the present disclosure.

Referring to FIG. 4, the adjacent resistive segments are made of different materials to form a plurality of sensing junctions therebetween, which function as thermocouple junctions. A thermocouple is an electrical device consisting of two dissimilar electrical conductors forming an electrical junction, which can generate a temperature-dependent voltage as a result of the thermoelectric effect. In the multipoint series sensor 17 of the present disclosure, the adjacent resistive segments 46, 48, 50, 52, 54, and 56 are made of dissimilar materials and are joined to form a plurality of sensing junctions 58. The plurality of sensing junctions 58 constitute a plurality of thermocouple junctions, each of which can generate a temperature-dependent voltage.

For example, the heating device 18 may define a plurality of zones $Z_1$, $Z_2$, $Z_3$, $Z_4$, and $Z_5$ corresponding to the number of sensing junctions 58. The plurality of zones may be a plurality of heating zones defined by a plurality of resistive heating wires or merely different areas of the heating device 18 when only one resistive heating wire is used. The first to fifth sensing junctions 58 generate voltage of $V_1$, $V_2$, $V_3$, $V_4$, and $V_5$, respectively. $V_1$, $V_2$, $V_3$, $V_4$ and $V_5$ are the mV potential signals generated at the junction of the nickel-chromium alloy/nickel-aluminum alloy wires, corresponding to the temperature of the plurality of zones $Z_1$, $Z_2$, $Z_3$, $Z_4$, and $Z_5$.

The output voltage (V) of the multipoint series sensor 17 represents a voltage relating to a temperature of the heating device 18 along the length of the heating device 18. That is, the polarity of the adjacent sensing junctions 58 are inversed as clearly indicated by "+" and "−" in FIG. 4, and their electric potentials cancel each other. Therefore, the output voltage (V) of the multipoint series sensor 17 represents a voltage related to a summation of the voltage change at each junction 58 and can be provided as: $V=\Sigma_{i=1}^{5} Vi$, where "i" is an i-th (e.g., i=1, 2, 3, 4, and 5) sensing junctions and "Vi" represents the mV potential signals generated at a respective junction. It should be noted that the total number junctions is provided as 5 to reflect the junctions provided in the example configuration of FIGS. 3A and 3B, but the total number of junctions can be less than or greater than 5.

In one form, the temperature at the heating device 18 is uniform, meaning temperature at each junction is constant (i.e., $T_i$=constant=$T_0$, where $T_i$ is temperature for i-th junction and $T_0$ represents a constant temperature), then the voltage at each junction is constant (i.e., $|V_i|$=constant). Accordingly, the output voltage (V) of the multipoint series sensor 17 is provided as $V_0$, where $V_0$ represents voltage associated with the constant temperature (e.g., $V=\Sigma_{i=1}^{5} Vi$, =$V_0$) and can be zero or some reference value determine via experimentation.

Figure 5:
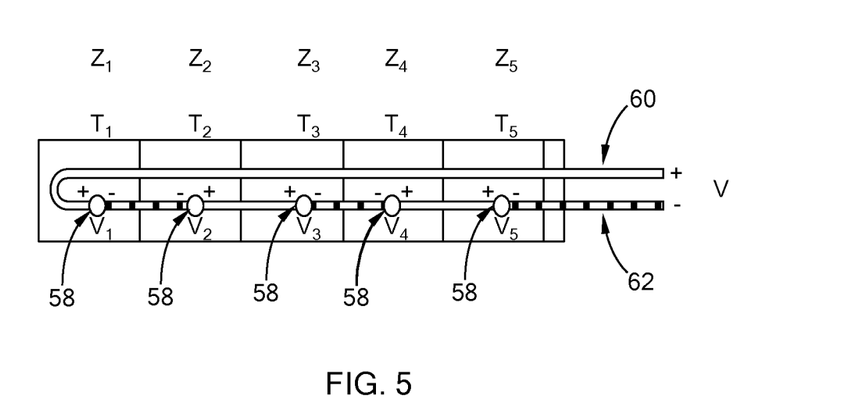
FIG. 5 is a schematic electric diagram of a multipoint series sensor of a temperature sensing system, where a thermal runaway occurs in one of a plurality of zones of the heating device, according to the teachings of the present disclosure.

Referring to FIG. 5, if any of the heating zones has a temperature higher than the temperature of the other zones, for example, due to film boiling in the heat exchanger application as illustrated herein, the sensing junction 58 in this particular heating zone generates a much higher voltage than that of the other sensing junctions 58. For example, if a thermal runaway occurs in the third zone $Z_3$, causing $V_3 \gg V_1, V_2, V_4, V_5$, then the multipoint series sensor 17 generates or has an output voltage indicative of the voltage at Zone Z3 (i.e., $V=\Sigma_{i=1}^{5} Vi \sim =V_3$). The summation of $V_1$, $V_2$, $V_4$ and $V_5$ may not be zero because the temperatures measured by the corresponding sensing junctions are not the same due to their different distances from the zone $Z_3$ where the thermal runaway occurred. However, the electric potentials $V_1$, $V_2$, $V_4$ and $V_5$ of the sensing junctions not in the overheating zone $Z_3$ may be very small compared to the electric potential $V_3$ of the sensing junction in the overheating zone $Z_3$. Therefore, the electric potentials $V_1$, $V_2$, $V_4$ and $V_5$ of the sensing junctions not in the overheating zone $Z_3$ can be considered to cancel each other in this example. In another example, if the electric potentials $V_1$, $V_2$, $V_4$ and $V_5$ of the sensing junctions not in the overheating zone $Z_3$ do not cancel or are not generally equal to $V_3$, the change in value would be measurable/detectable as being different than a normal operating value, thus indicating a temperature deviation/fluctuation.

In one form, the controller 15 is configured to determine the temperature deviation/fluctuation based on the output voltage of the multipoint series sensor 17, which is based on electrical potentials at the sensing junctions as set forth above. In one example application, the controller 15, which is electrically coupled to the multipoint series sensor 17 via the ends of the parallel legs, is configured to measure the output voltage of the multipoint series sensor 17 (e.g., the controller 15 may include sensors for measuring the output voltage). If the output voltage is substantially equal to a reference voltage that is associated with a condition in which the temperature is constant (e.g., $V=V_0$), the controller 15 is configured to determine that there is no temperature deviation. Alternatively, if the output voltage is different from the reference voltage, the controller 15 is configured to determine that there is a temperature deviation. In one form, various experiments can be conducted to determine the reference voltage(s) for standard operations and/or one or more constant temperatures and determine voltage(s) during a temperature fluctuation at one or more of the zones. This information can then be employed by the controller 15 in detecting abnormal operation.

The multipoint series sensor 17 including the plurality of sensing junctions 58 can detect localized temperature change from normal operating conditions. By detecting the changes in temperature, the multipoint series sensor 17 can identify the occurrence of thermal runaway at any point along the length of the heating device 18, as opposed a prior art sensor that can only detect actual temperature at a single point/location in the heating device.

Figure 6:
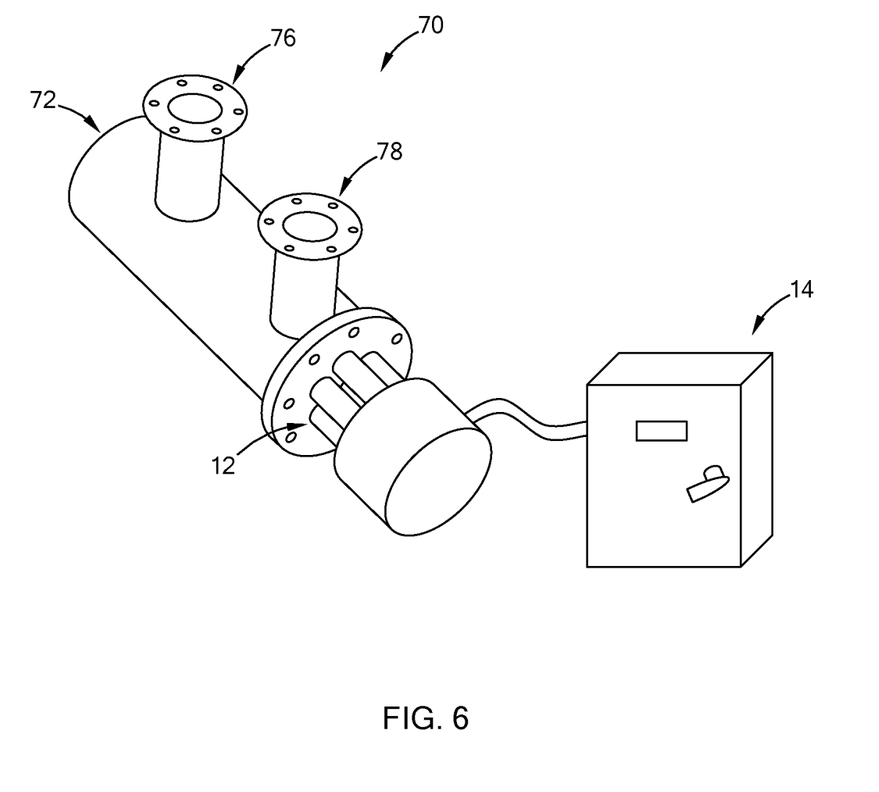
FIG. 6 is a perspective view of a heat exchanger including the heater system of FIG. 1, where the heater bundle is partially disassembled from the heat exchanger to expose the heater bundle for illustration purposes, according to the teachings of the present disclosure.

Referring to FIG. 6, a heater bundle 12 may be incorporated in a heat exchanger 70 in one application. The heat exchanger 70 includes a sealed housing 72 defining an internal chamber (not shown), a heater bundle 12 disposed within the internal chamber of the housing 72. The sealed housing 72 includes a fluid inlet 76 and a fluid outlet 78 through which fluid is directed into and out of the internal chamber of the sealed housing 72. The fluid is heated by the heater bundle 12 disposed in the sealed housing 72. The heater bundle 12 may be arranged for either cross-flow or for flow parallel to their length.

It is understood that the multipoint series sensor 17 may be embodied in a heating device of any type and of any configuration to identify thermal runaway across the heating device, and in applications other than heat exchangers, without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A temperature sensing system comprising:
a plurality of resistive segments extending from a first end to a second end and connected in electrical series, each resistive segment defining a material different from a material of an adjacent resistive segment, and the plurality of resistive segments being joined at respective sensing junctions between the first end and the second end to define a plurality of sensing junctions along a length of the plurality of resistive segments, wherein each of the plurality of sensing junctions has a polarity that is inverse to an adjacent sensing junction of the plurality of sensing junctions;
wherein a temperature deviation is determined from the plurality of sensing junctions based on electric potential at each of the sensing junctions.

2. The temperature sensing system according to claim 1, wherein the plurality of resistive segments are arranged in parallel legs having a u-shaped end portion between the parallel legs, wherein one parallel leg consists of a single material.

3. The temperature sensing system according to claim 1, wherein each of the resistive segments defines a length, and the length of each resistive segment is the same.

4. The temperature sensing system according to claim 1, wherein each of the resistive segments defines a length, and a length of at least one resistive segment is different from a length of another resistive segment.

5. A plurality of heating devices comprising the temperature sensing system according to claim 1.

6. The plurality of heating devices according to claim 5, wherein the plurality of resistive segments of the temperature sensing system are embedded in or disposed on an outer surface of each of the plurality of heating devices.

7. The plurality of heating devices according to claim 5, wherein the plurality of resistive segments of the temperature sensing system are embedded in or disposed on an outer surface of at least one of the plurality of heating devices.

8. The plurality of heating devices according to claim 5, wherein at least one heating device comprises a number of resistive heating wires defining a number of heating zones.

9. The plurality of heating devices according to claim 8, wherein the number of sensing junctions is equal to the number of the heating zones.

10. The plurality of heating devices according to claim 5, wherein at least one heating device comprises a single resistive heating wire defining one heating zone.

11. A heat exchanger comprising the plurality of heating devices according to claim 5.

12. A temperature sensing system comprising:
a multipoint series sensor having two parallel legs connected via a u-shaped end portion, wherein one of the two parallel legs includes:
a plurality of resistive segments connected by a first end to a second end in electrical series, wherein each resistive segment defines a material different from a material of an adjacent resistive segment, and
the plurality of resistive segments are joined at sensing junctions to define a plurality of sensing junctions between the first end and the second end along a length of the plurality of resistive segments, wherein each of the plurality of sensing junctions has a polarity that is inverse to an adjacent sensing junction of the plurality of sensing junctions, wherein the plurality of resistive segments are arranged to enable a determination of a temperature deviation and the determination of the temperature deviation is based on electric potential, the electric potential based on each of the sensing junctions.

13. The temperature sensing system according to claim 12, further comprising a controller electrically coupled to the multipoint series sensor and configured to measure an output voltage of the multipoint series sensor, wherein the controller is configured to determine an occurrence of the temperature deviation based on a comparison of the output voltage to a reference voltage.

14. The temperature sensing system according to claim 12, wherein the other one of the two parallel legs is defined by a single material.

15. The temperature sensing system according to claim 12, wherein each of the plurality of resistive segments defines a length, and the length of each resistive segment is the same.

16. The temperature sensing system according to claim 12, wherein each of the resistive segments defines a length, and a length of at least one resistive segment is different from a length of another resistive segment.

17. A plurality of heating devices comprising the temperature sensing system according to claim 12.

18. The plurality of heating devices according to claim 17, wherein the plurality of resistive segments of the temperature sensing system are embedded in or disposed on an outer surface of at least one of the plurality of heating devices.

19. The plurality of heating devices according to claim 17, wherein at least one heating device comprises a number of heating zones.

20. The plurality of heating devices according to claim 19, wherein the number of sensing junctions is equal to the number of the heating zones.

21. A heat exchanger comprising the plurality of heating devices according to claim 17.

22. The temperature sensing system of claim 13, wherein the reference voltage is associated with a condition in which a temperature is constant.

* * * * *